(12) United States Patent
Painchaud

(10) Patent No.: US 6,375,146 B1
(45) Date of Patent: Apr. 23, 2002

(54) HOLDING DEVICE FOR RODS AND THE LIKE

(76) Inventor: Maurice Painchaud, 54, Rue des Erables, Victoriaville, P.Q. (CA), G6P 2J1

( * ) Notice: Subject to any disclaimer, the term of this patent is extended or adjusted under 35 U.S.C. 154(b) by 0 days.

(21) Appl. No.: 09/533,213

(22) Filed: Mar. 23, 2000

(30) Foreign Application Priority Data

Mar. 23, 1999 (GB) ............................................. 9906538

(51) Int. Cl.[7] ............................................. A01K 97/10
(52) U.S. Cl. ........................ 248/534; 248/539; 248/541
(58) Field of Search ............................. 248/534, 536, 248/539, 541, 316.7

(56) References Cited

U.S. PATENT DOCUMENTS

| | | | | |
|---|---|---|---|---|
| 499,933 A | * | 6/1893 | Phillips | 280/176 |
| 713,888 A | * | 11/1902 | Kellner | 248/251 |
| 1,253,402 A | * | 1/1918 | Lovejoy | 248/541 |
| 1,906,874 A | * | 5/1933 | Platt | 24/457 |
| 2,795,834 A | * | 6/1957 | Szoke | 248/113 |
| 4,136,848 A | * | 1/1979 | McCollum | 248/316.7 |
| 4,687,168 A | * | 8/1987 | Rupp | 248/539 |
| 4,871,141 A | | 10/1989 | Chen | |
| 5,120,016 A | | 6/1992 | Dysarz | |
| 5,240,058 A | * | 8/1993 | Ward | 160/123 |
| 5,431,364 A | | 7/1995 | Etter | |
| 5,478,038 A | * | 12/1995 | Thorp et al. | 248/230.9 |
| 5,478,041 A | | 12/1995 | Mayne | |
| 5,564,670 A | | 10/1996 | Dysarz | |
| 5,582,384 A | | 12/1996 | Schoen | |
| 5,685,517 A | | 11/1997 | Salibra | |

* cited by examiner

Primary Examiner—Anita King
Assistant Examiner—Holly N. Sy

(57) ABSTRACT

The present invention is a holding device that can be used easily and simply mount and hold the cylindrical post of a large protecting umbrella or parasol at various angles to a variety of openwork guardrails outside patio or on a balcony. The tightening of securing bolts of the device simultaneously anchors the holding device to the guardrails and grasps the cylindrical post within symmetrical jaws of the device.

7 Claims, 2 Drawing Sheets

HOLDING DEVICE FOR RODS AND THE LIKE

FIELD OF THE INVENTION

The present invention relates to holding devices, more specifically to holding devices for holding cylindrical members such as rods and the like on openwork guardrails or railings.

BACKGROUND OF THE INVENTION

The use of umbrellas or parasols to keep wind, rain or excess solar heat and rays from individuals is well known. The principle employed in keepingwind, rain, sun heat and rays off individuals by the use of umbrellas is also shared in the application for use of relatively large umbrellas above picnic tables, on beaches and in some commercial applications.

The weight of the umbrella is an important factor in determining which anchoring or holding device will be effective. Another important consideration is where the umbrella is to be used, i.e. what anchoring structure will be provided in the area where the umbrella is to be utilized.

One of the most common ways to hold or anchor the post of a large umbrella is by the use of a massive large conical shaped base filled with sand or other heavy material. This base is laid down on the ground, and the lower end of the umbrella post is removably secured therein. This is often used when the umbrella is to be positioned for example at the center of an outdoor patio table especially provided with an opening passage at its center for the umbrella post.

Since the umbrella, especially when opened and under windy conditions, has a very high center of gravity, the base must be extremely heavy to enable the umbrella to sustain those conditions. This heavy base is relatively cumbersome, large and not easily movable, potentially even harming some children who would attempt to lift the base for storage for example. The above mentioned umbrella and base also often necessitate the purchase of this especially-made table with a central opening to provide if necessary the umbrella post, which is inserted into the table opening, with an additional support at essentially mid-height. By purchasing this large base, and this especially made table, the result is an increase in expenses for the User. Those umbrella posts are also always only fixed and positioned vertically.

Those umbrellas could be used without a table under low windy conditions, but this is usually not recommended by the manufacturer, hence requiring furthermore a large area for the table. No other devices also actually permits to anchor an umbrella to any other housing apparatus, therefore limiting the use of the latter to families and commerce having a large garden or large patio. Many families in our big cities live in apartment buildings and only have a limited access to the outside summer temperature via a relatively small balcony often too small to be able to receive those large tables and with no means to anchor an umbrella that could be positioned to cover for example half of their balcony, hence depriving them the chance to hold activities outside with protection against the wind, rain, sun heat or rays.

Similarly, no real possibilities exist for someone who wishes for example to install a large umbrella to an handrail mounted on a walking strip built beside or around a swimming pool, which would enable the anchoring of the umbrella to protect swimmers, since it is well understood that the Sun changes position and its rays are not always coming from a direct vertical angle. An anchoring device easily mounted on a variety of openwork handrails or railings to permit an easy change of location of the umbrella is therefore not available at the present moment. An anchoring device permitting to mount the umbrella at a certain angle is also not presently available.

Prior art approaches to provide an effective anchoring device for large umbrellas have failed to maximize the utility of the invention and only partially provide an answer to the need of a suitable simple, effective and non-damaging anchoring device.

OBJECTS OF THE INVENTION

It is therefore a general object of the present invention to provide a holding device for an umbrella or a parasol of the character described which obviates the above noted disadvantages.

Another object of the present invention is to provide a holding device that simultaneously grasps the umbrella post of an umbrella or parasol while securing the device to an openwork guardrail or railing.

A further object of the present invention is to provide a holding device for an umbrella or a parasol to be easily mounted and dismounted on a variety of openwork guardrails or railings without damaging the latter.

Another object of the present invention is to provide a holding device for an umbrella that allows for adjustment of the mounting angle of the umbrella post other than the vertical position.

A further object of the present invention is to provide a holding device for an umbrella that requires a minimum number of elements for its use, and that is light and safe.

A further object of the present invention is to provide a holding device for an umbrella that requires minimal structure to hold to where the umbrella is to be installed.

Another object of the present invention is to provide a holding device for an umbrella that is simple to manufacture and that allows for ergonomic assembly of a conventional umbrella post to the anchoring structure without requiring special tooling or manual dexterity.

SUMMARY OF THE INVENTION

The present invention consists of a holding device for holding a cylindrical member comprising: a grasping member including two generally symmetrical jaws having a closing resilient link therebetween at a respective proximal end thereof and distal ends for generally resiliently receiving said cylindrical member therebetween, an anchoring member for releasably anchoring said device to a support structure, and a securing member for simultaneously tightening said anchoring member to said support structure and said grasping member to said cylindrical member.

Preferably, the anchoring member includes a first section itself including said proximal ends of said grasping member and a second section, both sections releasably receive said securing member for rigidly holding said support structure therebetween, said securing member being located in close proximity to said resilient link to act on the after for firmly grasping said cylindrical member between said distal ends of said jaws of said device upon securing said device to said support structure.

Preferably, the first and second sections of said anchoring member are physically distinct from each other.

Preferably, the grasping member is provided with an elongated opening closed by said resilient link at said proximal ends, said elongated opening generally enlarging towards said distal ends to form an essentially circular opening therebetween, said circular opening for receiving said cylindrical member.

Preferably, the securing member includes two bolts and nuts essentially running through both said first and second sections of said anchoring member, said bolts and nuts being adjacent to and on a respective side of said resilient link.

Preferably, each of the first and second sections of said anchoring member are of elongated shape, generally perpendicular to said elongated opening, with two extremities, corresponding extremities of both sections for clamping said support structure therebetween upon tightening of said bolts and nuts. Preferably, the grasping member and the first section of said anchoring member are made out of strong and resilient thermoplastic.

BRIEF DESCRIPTION OF THE DRAWINGS

In the annexed drawings, like reference characters indicate like elements throughout.

DETAILED DESCRIPTION OF THE PREFERRED EMBODIMENTS

Figure 1:
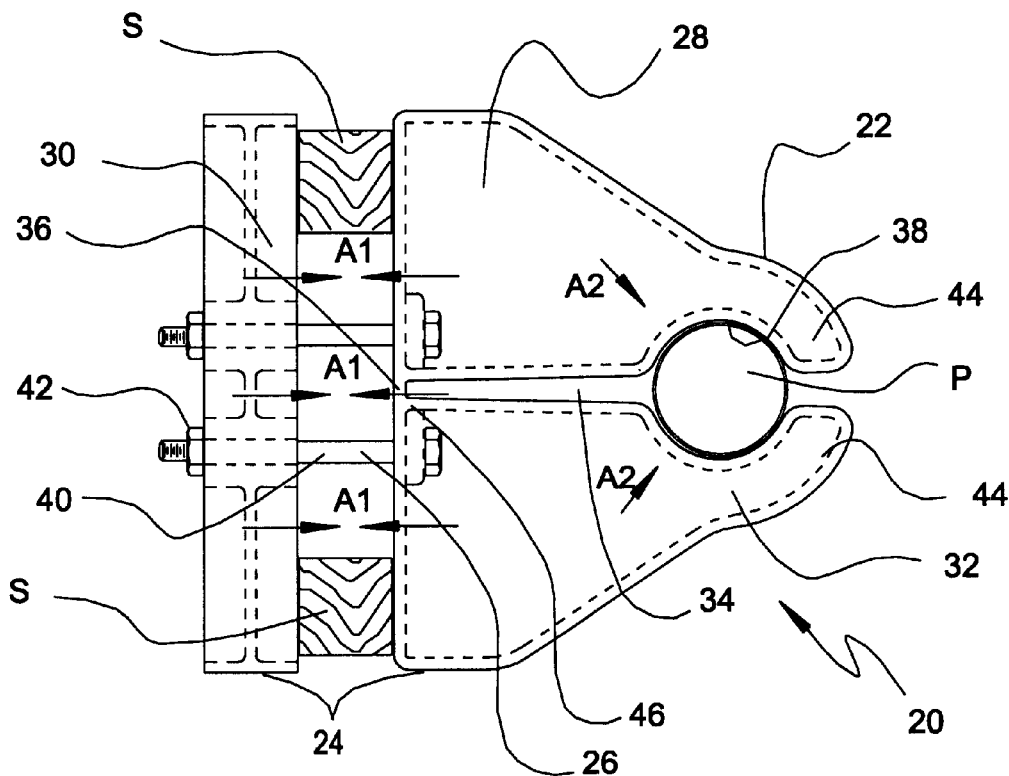
FIG. 1 is a top view of an embodiment of a holding device according to the present invention shown with an umbrella post and a support structure of an openwork guardrail or railing.
Figure 2:
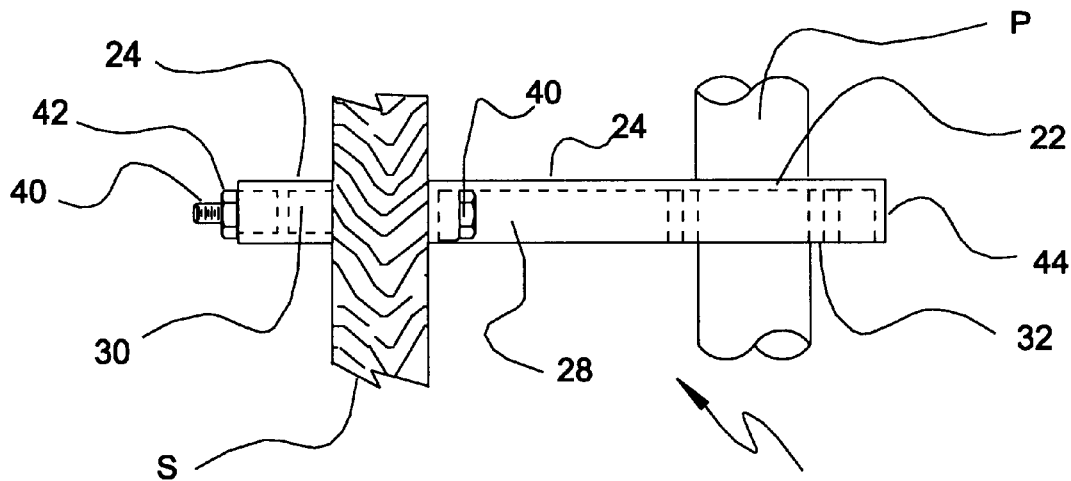
FIG. 2 is ion of the embodiment of FIG. 1.

Referring to FIGS. 1 and 2, there is shown an embodiment of an anchoring or holding device 20 according to the present invention. The holding device 20 comprises a grasping member 22, an anchoring member 24 and a securing member 26. The grasping member 22, preferably of triangular shape, is preferably affixed to a same piece with a first section 28 of the anchoring member 24 that is of a generally elongated shape. A second section 30 of the anchoring member 24 is preferably a separate, or physically distinct, and generally rectangular piece, and has its long side of preferably the same length as the corresponding first section 28 side of the anchoring member 24.

The securing member 26 is formed by preferably two bolts 40 and nuts 42. The nuts 42 and bolts 40 of the securing member 26 have a first function of rigidly anchoring the holding device 20 onto a support structure S by firmly but releasably wedging or clamping the support structure S between the first and second sections 28, 30 of the anchoring member 24. This is shown by arrows A1 of FIG. 1. Preferably, the bolts 40, apart from releasably fitting on respective holes of the first section 28, run through corresponding holes and along the short side of the generally rectangular second section 30 of the anchoring member 24. The support structure S is preferably in a form of two adjacent vertical bars of essentially uniform thickness of any guardrail G (shown of FIG. 4) or railing in an openwork design. This openwork design is necessary to ensure that the linkage by the bolts 40 and nuts 42 of the first and second section 28, 30 of the anchoring member 24 is not causing damage to the guardrail G.

The bolts 40 and nuts 42 are located in close proximity, preferably adjacent to and on a respective side of the resilient link 36 which furthermore allows the anchoring member 24 of the holding device 20 to be adapted to a large variety of openwork guardrail G or railing, which can have various sizes of spacing between two adjacent guardrail bars of the support structure S, as long as this spacing is large enough to allow for free passage of the bolts 40 of the securing member 26 but smaller than the length of the long side of the generally rectangular second section 30 of the anchoring member 24. The screwing or unscrewing action on the nuts 42 and bolts 40 for tightening or releasing the anchoring member 24 of the holding device 20 to or from the support structure S respectively is easily done using a standard ratchet (wrench) and a drive socket.

The positioning of the securing member 26 in close proximity to the resilient link 36 allows for a second and simultaneous function of the nuts 42 and bolts 40 of the securing member 26 of displacing the two jaws 32 of the grasping member 22 towards each other to tighten post P therebetween. This second simultaneous function is the simplicity and the heart of this invention, and is produced by the particular design explained herein. The tightening of the nuts 42 on the bolts 40 produces a force almost perpendicularly to the axis of the bolts 40 forcing and closing action onto the opening 34 due to the flexion of the resilient link 36 which in turn closes the circular opening 38 tightly confining the umbrella post P in the circular opening 38 between the distal ends 44 of the jaws 32 of the grasping member 22. This is shown by the arrows A2 on FIG. 1.

Figures 3, 4:
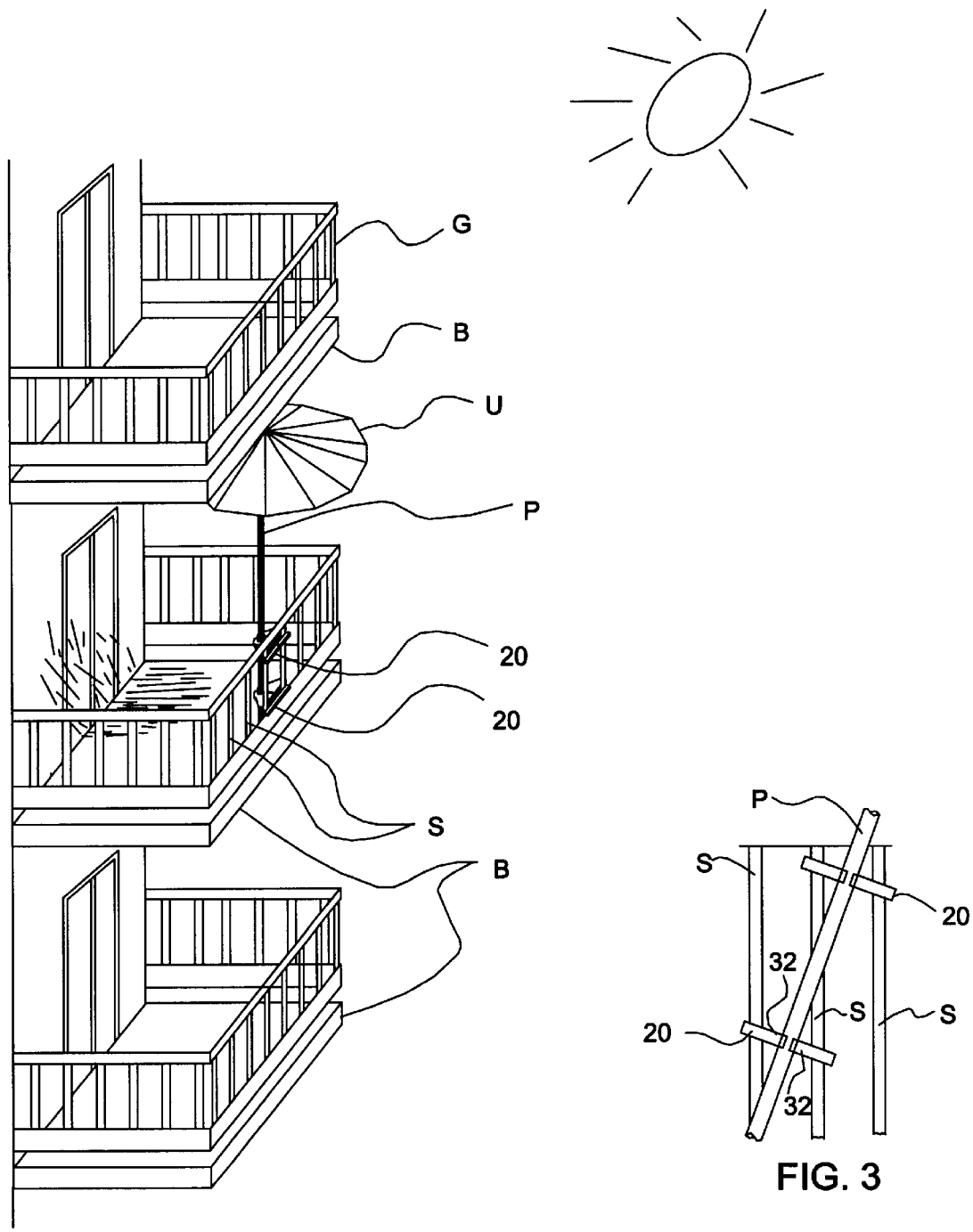
FIG. 3 is a left e view of the embodiment of FIG. 1 such installed to provide a non vertical angel position of the umbrella post.
FIG. 4 is a perspective view showing two embodiments of FIG. 1 holding a post and mounted on the openwork guardrail or railing of a balcony.

FIG. 3 shows that if the distance between the two generally vertical bars of the support structure S of the openwork guardrail G (not entirely shown here) or railing permits it, the holding device 20 can be positioned in a non-horizontal manner allowing for the umbrella post P and the umbrella or parasol itself (shown on FIG. 4) to be positioned in the corresponding angled, non-vertical manner to enhance the possibilities of maximum shield or protection from the latter.

FIG. 4 shows a partial view of a side of a high-rise building with three balconies B from three adjacent floors located above one-another. The three balconies B are provided with openwork guardrails G or railings. The in-between balcony is partially protected from solar heat, rays, or rain by an umbrella U or parasol mounted on its guardrail G with, in this case, two holding devices 20. This shows the usefulness possibly provided by the holding device 20 over more standards ways of anchoring an umbrella U, which could not always be possible under similar specific circumstances on high-rise balconies B.

Although an embodiment has been described herein with some particularity and details, many modifications and variations of the preferred embodiment are possible without deviating from the scope of the present invention.

I claim:

1. A holding device for holding a cylindrical member comprising: a grasping member including two generally symmetrical jaws having a closing resilient link therebetween at a respective proximal end thereof and distal ends for slidably receiving said cylindrical member therebetween, an anchoring member for releasably anchoring said device to a support structure, and a securing member for releasably securing said anchoring member to said support structure, and being located in close proximity of said resilient link for simultaneously releasably securing said grasping member to said cylindrical member.

2. A holding device as defined in claim 1, wherein said anchoring member includes first and second sections releasably receiving said securing member for rigidly holding said support structure therebetween, said first section including said proximal ends of said grasping member for firmly grasping said cylindrical member between said distal ends of said jaws of said device upon securing said device to said support structure.

3. A holding device as defined in claim 2, wherein said first and second sections of said anchoring member are physically distinct from each other.

4. A holding device as defined in claim 2, wherein said grasping member is provided with an elongated opening closed by said resilient link at said proximal ends, said elongated opening generally enlarging towards said distal ends to form a substantially circular opening therebetween, said circular opening for receiving said cylindrical member.

5. A holding device as defined in claim 4, wherein said securing member includes two bolts and nuts running through both said first and second sections of said anchoring member, said bolts and nuts being adjacent to and on a respective side of said resilient link.

6. A holding device as defined in claim 5, wherein each of said first and second sections of said anchoring member are of elongated shape, generally perpendicular to said elongated opening, with two extremities, corresponding extremities of both sections for clamping said support structure therebetween upon tightening of said bolts and nuts.

7. A holding device as defined in claim 6, wherein said grasping member and said first section of said anchoring member are made out of strong and resilient thermoplastic.

* * * * *